United States Patent
Shatsky et al.

(10) Patent No.: US 8,135,866 B2
(45) Date of Patent: Mar. 13, 2012

(54) SYSTEM AND METHOD FOR DETECTING AND PROCESSING STALE MESSAGES

(75) Inventors: Alexander Shatsky, Waterloo (CA); Haiyang Yin, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 200 days.

(21) Appl. No.: 12/692,402

(22) Filed: Jan. 22, 2010

(65) Prior Publication Data
US 2011/0185010 A1    Jul. 28, 2011

(51) Int. Cl.
G06F 15/16 (2006.01)
G06F 15/173 (2006.01)

(52) U.S. Cl. ......... 709/248; 709/238

(58) Field of Classification Search ......... 709/203, 709/231, 238, 248
See application file for complete search history.

(56) References Cited

U.S. PATENT DOCUMENTS

| | | | |
|---|---|---|---|
| 6,823,347 B2 | 11/2004 | Chandrasekaran | |
| 7,359,406 B2 | 4/2008 | Holloway et al. | |
| 7,562,154 B2 * | 7/2009 | Gomez | 709/238 |
| 2005/0041692 A1 | 2/2005 | Kallstenius | |
| 2006/0250988 A1 * | 11/2006 | Garcia et al. | 370/260 |
| 2007/0140127 A1 * | 6/2007 | Frei | 370/238 |
| 2009/0138356 A1 * | 5/2009 | Pomplun | 705/14 |

FOREIGN PATENT DOCUMENTS

| | | |
|---|---|---|
| EP | 1710976 A1 | 10/2006 |
| WO | WO2007073465 A1 | 6/2007 |

OTHER PUBLICATIONS

Rosenberg et al. (Jun. 2002) RFC 3261 "SIP: Session Initiation Protocol", 6th paragraph on p. 49, 9th paragraph on p. 144.*
PCT International Search Report and Written Opinion, PCT/CA2011/050030, Apr. 28, 2011.

* cited by examiner

Primary Examiner — Peling Shaw
(74) Attorney, Agent, or Firm — Quarles & Brady LLP

(57) ABSTRACT

A system and method for handling stale messages is presented. A first message is transmitted to a peer entity. The first message includes a first timestamp. A second message is received from the peer entity. The second message is related to the first message and includes a second timestamp. A third message is received from the peer entity. The third message includes a third timestamp. A staleness of the third message is determined using the first timestamp, second timestamp, and third timestamp. When the third message is stale, the third message is at least one of ignored and discarded. When the third message is not stale, the third message may be processed.

27 Claims, 5 Drawing Sheets

SYSTEM AND METHOD FOR DETECTING AND PROCESSING STALE MESSAGES

BACKGROUND

The present disclosure relates generally to stale message detection and, more specifically, to stale message detection in application protocols that use non-real-time transports.

As used herein, the terms "User Agent" and "UA" can refer to wireless devices such as mobile telephones, personal digital assistants (PDAs), handheld or laptop computers, IP phones, and similar devices or other user equipment ("UE") that have telecommunications capabilities. In some embodiments, a UA may refer to a mobile, wireless device. The term "UA" may also refer to devices that have similar capabilities but that are not generally transportable, such as desktop computers, set-top boxes, or network nodes. Throughout this disclosure, UA may refer to a session initiation protocol (SIP) UA such as a wireless device, set-top box, or other communication devices and is interchangeable with the term UA.

When communicating using a wireless network, various Internet protocols (IP) can be implemented for allowing communication between a UA and a network. One example protocol, as defined in Third Generation Partnership Project (3GPP) systems, includes an internet protocol (IP) multimedia subsystem (IMS) that allows for the delivery of IP multimedia services. Using IMS, a UA may transmit and receive multimedia and/or voice packet switched (PS) communications via a base station implementing one or more IMS Functional Component. To implement IMS, networks rely upon SIP to provide a text-based signaling protocol that may be used to communicate between a UA and the IMS Core Network (CN), between the IMS CN and Application Servers, and between various other components of the IMS Network.

Generally, these protocols use a request-response communication strategy. As such, when communicating, messages such as request messages are sent by a first entity. The request messages are processed and response messages are then transmitted. The response messages generally include data responsive to the sent message. These combinations of sent messages and response messages allow for the communication of data and protocol states between a protocol Client and a protocol Server.

The following is an example of one such protocol. If a protocol Client (e.g. a Client entity, a User Agent Client (UAC) as described in "IETF RFC 3261 SIP: Session Initiation Protocol," or a client UA) wishes to establish a session, the Client may send a request message (e.g. a SIP INVITE message) to a protocol Server. The message is received by a Server, and the Server (e.g. a Server entity, a User Agent Server (UAS) as described in "IETF RFC 3261 SIP: Session Initiation Protocol" or a server UA) replies to the request message with a response message that can contain a state of the processed request message and other protocol data. The Client receives the response message and processes the message accordingly. If the Client is configured to expect to receive a response message and does not receive a response within a particular time period, the Client may consider the original request as failed and report the failure to the requesting application.

In some cases, real-time communication protocols may be implemented using non-real-time transports. Non-real-time transports allow messages to be queued for delivery at a later time, but can be used as transports for real-time protocols that presume non-delayed processing and delivery of messages. In existing networks, an example real-time protocol includes IMS centralized services (ICS) that allows various IMS services to be provided to a UA using a wireless network where voice communications are provided over a circuit-switched (CS) bearer and other media components are provided over a packet-switched (PS) bearer. Generally, ICS requires the support of two real-time transport bearers: a bearer for voice, and a bearer to support the control signaling that uses SIP signaling. In some circumstances, however, the bearer for supporting SIP signaling may be unavailable, for example, because Gm connectivity does not exist (e.g., no PS roaming agreement exists or data connectivity is not available), the UA is unable to register with the IMS infrastructure because of operational issues, or dual transfer mode (DTM) is unavailable in the cell or the wireless device. In that case, the non-real-time I1 protocol transport is used instead and allows a wireless device to implement a SIP-like signaling protocol using a CS bearer in the place of the Gm interface. In that case, the I1 protocol uses or binds to transport protocols such as but not limited to short message service (SMS), unstructured supplementary service data (USSD), or proprietary protocols that make use of their own equipment and technology to queue the messages for later delivery. The use of these transport protocols, however, may result in significant delay (or potential failure) in the delivery of messages between a protocol client and a protocol server.

Because the transport protocol may include non-real-time interfaces (e.g., the I1 interface, or any other I1-like or SIP-like protocol, for example), the transport may insert significant delay into the delivery of a message. If the message is sufficiently delayed, the message may become stale meaning that the message should be discarded by the receiving entity because the message relates to services that are no longer requested or being used. For example, a protocol Client may send a request to a protocol Server using a non-real-time transport such as SMS. If the Server is out of coverage or turned off, the Server cannot immediately receive the message and respond accordingly. As a result, after failing to deliver the message directly to the Server, the SMS infrastructure stores the message for later delivery, possibly resulting in substantial delay between the Client's transmission of the request message and receipt of the message by the Server resulting in a communication failure.

Eventually, though, after the communication failure has already been reported by the Client to the requesting application, the protocol server will return to coverage and be powered-up. At that time, the SMS infrastructure detects that the Server is available and delivers the stale Client request to the Server. Upon receipt of the request message, the Server processes the request message and generates a response. The response message is then transmitted to the Client where it may be processed.

This protocol behavior may result in an unsatisfactory user experience. If, for example, the Client had originally issued a SIP INVITE message, after receiving the delayed request, the Server application may alert the user of an incoming call that is, in fact, several hours old. Furthermore, if a message is stale and should not be processed, communications protocols that attempt to process and respond to all messages, stale or not, create unnecessary traffic on the network in both wireless and fixed segments of the networks.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
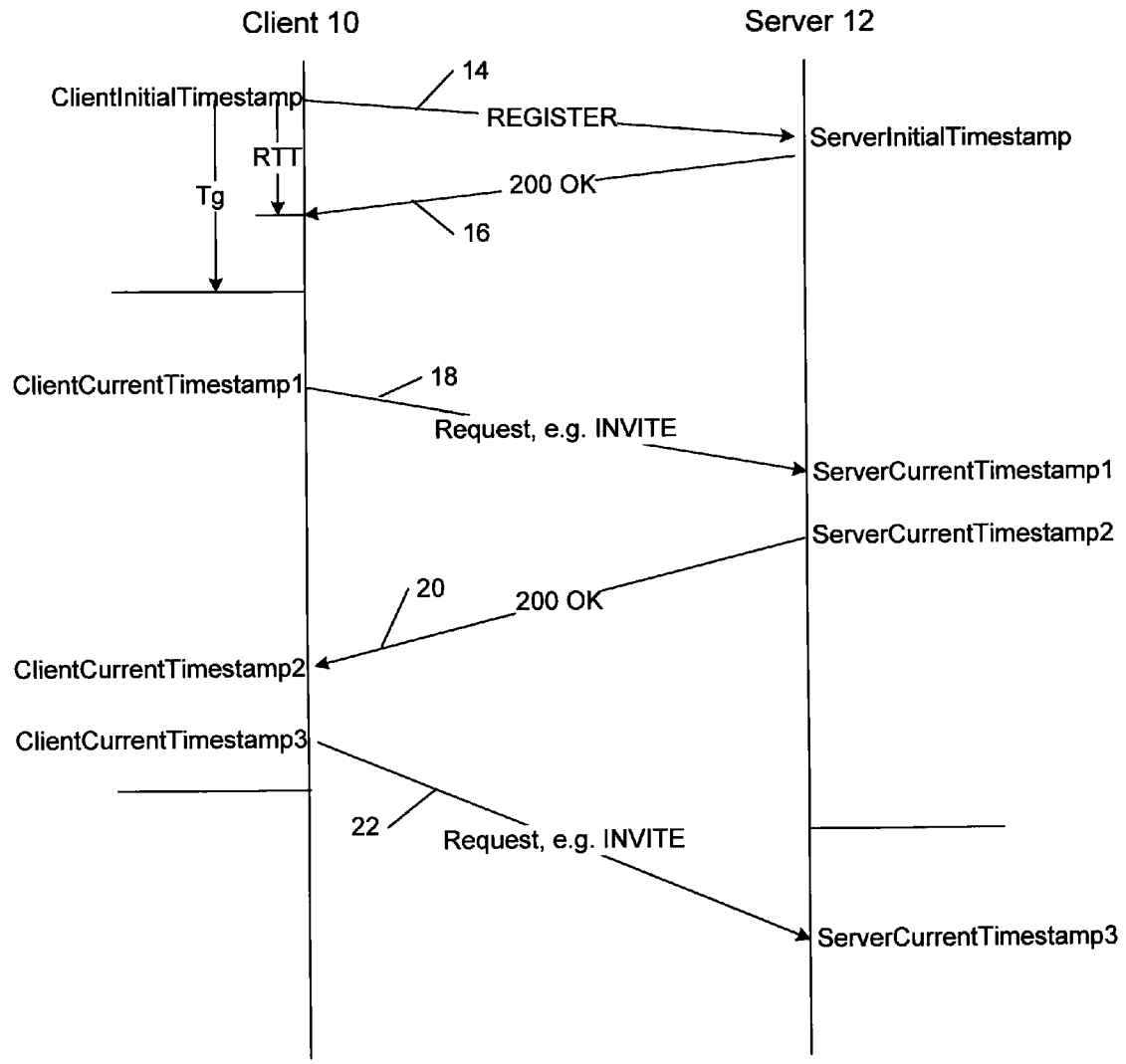
FIG. 1 is an illustration of an example message flow between a protocol Client and a protocol Server that includes several messages, which may each be analyzed to determine whether the messages are stale.

The present disclosure relates generally to stale message detection and, more specifically, to stale message detection in application protocols that use non-real-time transports.

To this end, some embodiments include a method for handling stale messages. The method includes transmitting a first message to a peer entity. The first message includes a first timestamp. The method includes receiving a second message from the peer entity. The second message is related to the first message and includes a second timestamp. The method includes receiving a third message from the peer entity. The third message includes a third timestamp. The method includes determining a staleness of the third message using the first timestamp, second timestamp, and third timestamp, and, when the third message is stale, at least one of ignoring and discarding the third message.

Other embodiments include a method for handling stale messages. The method includes determining a first timestamp. The timestamp includes a current time. The method includes transmitting a registration request to a peer entity. The registration request includes the first timestamp. The method includes receiving a registration response from the peer entity. The registration response includes a second timestamp. The method includes receiving a third message from the peer entity. The third message includes a third timestamp. The method includes determining a staleness of the third message using the first timestamp, second timestamp, and third timestamp, when the third message is stale, at least one of ignoring and discarding the third message, and, when the third message is not stale, processing the third message.

Other embodiments include a communication apparatus for handling stale messages. The communication apparatus includes a processor configured to transmit a first message to a peer entity. The first message includes a first timestamp. The processor is configured to receive a second message from the peer entity. The second message is related to the first message and includes a second timestamp. The processor is configured to receive a third message from the peer entity. The third message includes a third timestamp. The processor is configured to determine a staleness of the third message using the first timestamp, second timestamp, and third timestamp, and, when the third message is stale, at least one of ignore and discard the third message.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the disclosure can be employed. Other aspects, advantages and novel features of the disclosure will become apparent from the following detailed description of the disclosure when considered in conjunction with the drawings.

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

When communicating using a wireless network, various real-time internet protocols (IP) can be implemented using non-real-time transports such as short messaging service (SMS), unstructured supplementary service data (USSD) used by the I1 interface to transmit data, or other proprietary protocols that make use of their own equipment and technology to queue the messages for later delivery. When using non-real-time transports, such as I1, the delivery of various messages may be substantially delayed making it difficult to determine whether a particular message is stale and should, therefore, be discarded.

The I1 protocol is a call control protocol that may be used in IMS networks to convey data when a data channel is unavailable and the voice channel is used to transmit the data in the data channel's place (e.g., because Gm connectivity does not exist such as when no packet-switched (PS) roaming agreement exists). Exemplary transports for the I1 protocol messages include SMS and USSD. Due to the limitations of the transport protocols (e.g., SMS message size may not exceed 160 bytes), the I1 protocol is designed to be a compact, binary protocol with a limited set of functions and capabilities as compared to session initiation protocol (SIP).

Throughout the present disclosure, the SIP protocol is presented as an exemplary protocol for demonstrating the present system and methods. In some cases, to support the present systems and methods using the I1 protocol, the I1 protocol may be enhanced with a new message type such as one of the following:

I1 SYNC
I1 TIME-SYNC
I1 STATUS
I1 PING
I1 HEALTH-CHECK
I1 REGISTER
I1 SUBSCRIBE
I1 INFO
I1 MESSAGE
I1 OPTIONS
I1 SYNCHRONIZATION
I1 ASSOCIATION

In some cases, however, an existing I1 message type (e.g. I1 NOTIFY, I1 INVITE, I1 SUBSCRIBE) may be used to carry the same information as the SIP REGISTER request below.

The present system and method allows for timestamp information to be communicated between a protocol Client and a protocol Server. When implementing any communications protocol, the entity initiating a message transfer may be referred to as the protocol Client or Client, while the receiving entity may be referred to as the protocol Server or Server. Accordingly, in one or more of the present examples, the Server may include a client device that receives a message initiated by a server device. Conversely, the Client may include a server device that initiates a communication to a client device. Accordingly, the terms 'Server' and 'Client' shall not be used to limit the type of device or network entity, or require the presence or absence of particular hardware, software, or device capabilities that may, at any time, operate as a Server or Client within the scope of the present disclosure.

The timestamp information allows the protocol Client or protocol Server to detect stale messages. After detecting a stale message, the message can be ignored minimizing unnecessary traffic on the network and preventing inaccurate or nonsensical user interactions. The stale message can also be rejected by the protocol Server with a response code or another indication indicating to the protocol Client that the received by the Server request was stale. In one implementation of the present system a time-to-live (TTL) is defined for a particular communication session on each of the protocol Client and protocol Server (e.g., TTL-Client and TTL-Server, respectively). Messages received, for example, on the Client during the TTL-Server time period are received and processed as normal. Messages received by the Client after the TTL-Server period for a particular session has expired, however, may be considered stale and discarded by the receiving party. The Server may similarly use the TTL-Client value to determine whether messages received by the protocol Server are stale.

In the present system, a Client and a Server exchange (or receive from another source) timestamp data during an initial handshaking procedure and use the timestamp data while processing communications between the Client and Server to verify that incoming messages are valid and not stale. The Client and Server may exchange timestamps during an initial handshaking procedure using the same transport bearer for both time synchronization and the later data or message transmissions. In another implementation, however, the Client and Server exchange timestamp information during an initial handshaking procedure using a first transport bearer for time synchronization and then use a second transport bearer for message or data transmissions. Alternatively, the client and server may each independently retrieve the timestamp or time synchronization information from the same third-party source (e.g. an network time protocol (NTP) Server) or different third-party sources providing accurate timestamp information. Depending upon the system implementation, the initial handshaking procedure between a protocol Client and protocol Server may establish an initial timestamp value of 0 on both the Client and Server. Alternatively, the timestamp may be allocated a random initial value, or be determined based upon a current time, network time, date, or some other value.

After exchanging time synchronization information, the system detects stale messages transmitted using a plurality of protocols including, but without limitation, I1, HTTP, transmission control protocol/IP (TCP/IP), SIP, I1-like or SIP-like protocols and other communications protocols. For example, in the case of SIP signaling, the timestamp information can be communicated during a registration or re-registration procedure.

During SIP registration, the Client (e.g., an endpoint, IMS UE, or SIP UA) first establishes a trusted relationship with the Server (e.g., a SIP registrar, or IMS S-CSCF). The relationship is usually established by means of a registration or subscription procedure. For example, a SIP UA may send a SIP REGISTER request to a SIP registrar. In response, the SIP registrar may challenge the request using, for example, a SIP digest authentication mechanism or other registration procedures (see, for example, the procedures described in 3GPP TS 24.229, subclause 5.1.1.2 "Initial Registration").

After receiving the challenge response, the SIP UA processes the challenge information contained in the response and recalculates the SIP digest information based upon the received challenge information and a private key or phrase pre-provisioned to the SIP UA. After processing the challenge response, the SIP UA retries the registration procedure and includes the recalculated SIP digest information in the second SIP REGISTER request.

After receiving the second SIP REGISTER request containing the recalculated digest information, the SIP registrar processes the request and, if the SIP registrar finds that the authentication information provided in the request is correct, accepts the registration by replying with a 200 OK message in response to the second SIP REGISTER request. Note that various registration procedures may be implemented in this manner for an IMS UE and IMS S-CSCF.

During this registration procedure, the Client may be configured to insert a timestamp into the SIP REGISTER message. An example SIP REGISTER message is shown in Table 1 with the timestamp value underlined. The timestamp value may be generated during the SIP REGISTER message construction, for example, and may include a central processing unit (CPU) timestamp identifying the current time. The timestamp may be formatted in any configuration used by both the protocol Client and Server as long as the Client and Server are both configured to process the timestamp format. The timestamp value may alternatively be encoded in various SIP header such as the Timestamp or Date header.

TABLE 1

REGISTER sip:registrar.home1.net SIP/2.0
Via: SIP/2.0/UDP [5555::aaa:bbb:ccc:ddd];comp=sigcomp;branch=z9hG4bKnashds7
Max-Forwards: 70
P-Access-Network-Info: 3GPP-UTRAN-TDD; utran-cell-id-3gpp=234151D0FCE11
From: <sip:user1_public1@home1.net>;tag=4fa3
To: <sip:user1_public1@home1.net>
Contact:
<sip:[5555::aaa:bbb:ccc:ddd];comp=sigcomp>;expires=600000
Call-ID: apb03a0s09dkjdfglkj49111
Timestamp: 540
Authorization: Digest username="user1_private@home1.net", realm="registrar.home1.net", nonce="", uri="sip:registrar.home1.net", response=""
Security-Client: ipsec-3gpp; alg=hmac-sha-1-96; spi-c=23456789; spi-s=12345678; port-c=2468; port-s=1357
Require: sec-agree
Proxy-Require: sec-agree
CSeq: 1 REGISTER
Supported: path
Content-Length: 0

The Server, upon receiving a SIP REGISTER message that includes the timestamp, stores the Client's (or received) timestamp (ClientInitialTimestamp) value along with the current (or local) timestamp on the Server (ServerInitialTimestamp). Then, if all registration requirements have been satisfied, the Server generates a SIP 200 OK response message to indicate that the Client is successfully registered. The response message contains the Server's timestamp (ServerInitialTimestamp) generated by the Server. An example SIP 200 OK response is shown in Table 2 with the timestamp value underlined. The Client retrieves the timestamp value from the 200 OK response and stores the timestamp value (ServerInitialTimestamp) along with the current timestamp on the Client. At the conclusion of the process, both the Server and the Client have stored timestamps indicating the time at which both they and the other entity initiated the registration or subscription process.

TABLE 2

SIP/2.0 200 OK
Via: SIP/2.0/UDP [5555::aaa:bbb:ccc:ddd]:1357;comp=sigcomp;branch=z9hG4bKnashds7
To: <sip:user1_public1@home1.net>
Contact:
<sip:[5555::aaa:bbb:ccc:ddd];comp=sigcomp>;expires=600000
Call-ID: apb03a0s09dkjdfglkj49111
Timestamp: 213
Path: <sip:term@pcscf1.visited1.net;lr>
Service-Route: <sip:orig@scscf1.home1.net;lr>
Contact:
<sip:[5555::aaa:bbb:ccc:ddd]:1357;comp=sigcomp>;expires=600000
CSeq: 1
Date: Wed, 11 July 2001 08:49:37 GMT
P-Associated-URI: <sip:user1_public2@home1.net>, <sip:user1_public3@home1.net>, <sip:+1-212-555-1111@home1.net;user=phone>
Content-Length: 0

After registration, if either the Client or Server detect that the timestamps require synchronization, either entity may issue a subsequent re-registration request to transmit a replacement initial timestamp to synchronize the timestamps. A time synchronization request may be issued by either the Client, Server, or both, with the Client and/or Server determining a need for synchronization based on a current state and/or status of either entity. For example, if the Client is restarted or reset, or if the Server is unavailable and the timestamp information is lost, the Client may initiate a time synchronization procedure by sending a new REGISTER request to Server. Similarly, in the case of a stand-by Server, when the stand-by Server becomes active, the stand-by Server may send a MESSAGE request with the timestamp information to the Client to synchronize the timestamp information on both the Client and Server.

In some cases, requests (or procedures) other than REGISTER (registration procedure) may be used to synchronize timestamps between a Client and Server. For example, SUBSCRIBE (subscription procedure), OPTIONS, INFO, REFER, NOTIFY, MESSAGE, etc requests can be used to carry the timestamp information. Alternatively, a timestamp value can be included into a message's XML-body that is carried by one or more SIP methods. Alternatively, a Timestamp value can be included into a non-XML body such as, but not limited, to a text/plain format body that is carried by any SIP methods. Alternatively, the Server can be configured to force the Client to re-register by sending a NOTIFY request for the reg-event package with the subscription state "terminated". In that case, the NOTIFY request triggers the Client to initiate a new registration (synchronization) procedure.

In other implementations, the Client (e.g., and I1 UE) has been registered with the Server (e.g., an IMS SCC AS). The relationship may have been established during the IMS registration procedure when the UE registers with S-CSCF by means of an IMS registration procedure and the S-CSCF establishes the third party registration with the SCC AS on behalf of the UE. In that case, the Client (or I1 UE) may insert a timestamp into an I1 message such as a I1 Register message described above). The I1 Register message may be configured, for example, in conformance with the requirements specified in 3GPP TS 24.294 Technical Specification Group Core Network and Terminals; IMS Centralized Services (ICS) Protocol via I1 Interface and be used by the Server to detect stale messages received from the Client.

In one example, the Server (or SCC AS) receives an I1 Register message containing a timestamp value. The timestamp value is inserted by the Client during message construction. The Server retrieves the timestamp value and stores the timestamp value as ClientInitialTimestamp along with the current (or local) timestamp on the Server (ServerInitialTimestamp). The Server may then generate an I1 Success response to indicate that the time synchronization procedure is successfully completed. In the response, the Server inserts the timestamp value containing the ServerInitialTimestamp. The Client receives the I1 Success response and retrieves the timestamp value. The Client then stores the timestamp ServerInitialTimestamp and may additionally store the current timestamp on the Client (ClientCurrentInitialTimestamp). Accordingly, after transmitting the I1 Register message and processing of the response, both the Client and Server have stored timestamp information including ClientInitialTimestamp, and ServerInitialTimestamp. Alternatively, the time synchronization procedure may be initiated by the Server. In that case, the Server constructs and send the I1 Register message and the Client replies to the messages with an I1 Success response.

In other implementations, timestamp information may be communicated using transport bearers that are separate from those used by each of the Client and Server for communication. The use of a separate transport bearer allows for a real-time bearer to be used for communicating timestamp information, while a non-real-time bearer may be used for general communication. If the messages containing the timestamp information are communicated using a non-real-time bearer, the timestamp information may be substantially delayed in transit, resulting in the use of inaccurate timestamp information. Accordingly, the use of a real-time bearer for the communication of timestamp information may increase the accuracy of the timestamp information as there would likely be less delay when transmitting the timestamp information. As such, in one implementation of the present system, the handshaking or registration (or time synchronization) procedures as described above are performed using a real-time transport bearer (e.g. SIP over TCP/IP, or I1 over TCP/IP), while the non-registration messages are communicated using a non-real-time transport bearer (e.g. SIP over SMS, or I1 over SMS/USSD).

For example, a SIP REGISTER message containing a timestamp may be sent by the Client over a SIP standard transport protocol UDP, to a protocol Server. After receiving the SIP REGISTER message containing the timestamp, the protocol Server stores the Client's timestamp (ClientInitialTimestamp) contained in the REGISTER message and replies to the SIP REGISTER message with a message including the Server's own timestamp. The Client receives the SIP REGISTER response and stores the Server's timestamp (ServerInitialTimestamp) as described above. At that point, the time handshaking procedure is completed and both the Client and Server have stored timestamp information.

After completing the handshaking procedure, if the IP bearer becomes unavailable (or the Client prefers a non-real-time transport), the Client and Server may use the previously stored timestamps when creating and processing messages transmitted using the non-real-time bearer (e.g. I1 INVITE or SIP INVITE over SMS/USSD transport) to verify that messages received using the non-real-time bearer are not stale. In other implementations, however, the Client and Server may be configured to use separate transport bearers for the time synchronization (handshaking) procedure. For example, when a first transport bearer (or protocol) is available, it is used for the time synchronization procedure. When the first transport bearer (or protocol) becomes unavailable, the second transport bearer (or protocol) may be used instead.

Alternatively, rather than pass timestamp information between the protocol Server and Client, the information can be retrieved directly from a third party. For example, both the Server and Client may be configured to retrieve current time information from time services or servers providing services such as NTP. (NTP is a protocol for synchronizing the clocks of computer systems over packet-switched, variable-latency data networks), or other network-based time synchronization systems. After retrieving the current time information from an appropriate third party, both the ClientInitialTimestamp and ServerInitialTimestamp stored on the Client and the ServerInitialTimestamp and ClientInitialTimestamp values on the Server may be set equal to the timestamp retrieved from the third party. After retrieving and storing the timestamp information, the protocol Client or Server may use the stored timestamp information when constructing, sending, and processing messages over real-time or non-real time bearers (e.g. I1 INVITE or SIP INVITE over SMS/USSD transport).

With the ClientInitialTimestamp and ServerInitialTimestamp stored by both the protocol Client and Sever, the timestamp information can be used to detect stale messages and to ensure that any stale messages are discarded appropriately. The timestamp information may also be used to prevent the transmission of stale messages by either entity. The timestamp information may be transferred using any of the above-described methods.

During communication, requests or messages that are received by either the Client or Server include a current timestamp that is generated at the time the message is constructed by the peer. The current timestamp in the request or message can then be checked against the timestamp that was received during the initial handshaking procedure (e.g., the ClientInitialTimestamp or the ServerCurrentTimestamp values). If the difference in time between the initial and current timestamp is within an acceptable value, the message is processed. If, however, the difference in time between the initial and current timestamp is greater than an acceptable value, the message is considered stale and discarded with no response being generated. Alternatively, a response may be generated, however, because the transaction TTL has expired the message is to be discarded by the protocol Client.

If, for example, a protocol Client generates a request to a protocol Server, the Client is configured to insert a current timestamp value into the request (ClientCurrentTimestamp). Upon receipt, the Server generates a ServerCurrentTimestamp based upon the time at which the message was received. At that point, the Server may first determine a time difference between the ClientCurrentTimestamp and the ClientInitialTimestamp. The Server also determines a TTLServer value that is equal to the difference between the ServerCurrentTimestamp and the ServerInitialTimestamp. If the difference between the ClientCurrentTimestamp and the ClientInitialTimestamp is greater than or equal to the TTLServer minus an acceptable deviation, the message may be considered not stale. The acceptable deviation for this comparison procedure may be protocol specific. One example deviation value for SIP protocol is approximately 64*T1 timer as defined in RFC 3261.

After the Server has validated and processed the request, the Server constructs and sends a response to the request to the Client. The Server may include a ServerCurrentTimestamp in the response. The Client may then verify that the difference between the ServerCurrentTimestamp and the ServerInitialTimestamp is greater than or equal to TTLClient minus a deviation. The TTLClient value may be equal to the difference between the ClientCurrentTimestamp and the ClientInitialTimestamp. If the response is validated successfully, the response may be processed by the Client. Otherwise, the message may be considered stale and discarded.

In one implementation, for example, the Server uses equation (1) to detect whether a received request is stale. If the statement in equation (1) is true, the message is not stale. If, however, the statement is false, the message is considered stale and discarded. In equation (1) the value of TTLServer may be equal to ServerCurrentTimestamp−ServerInitialTimestamp.

$$\text{ClientCurrentTimetsamp} - \text{ClientInitialTimestamp} \geq \text{TTLServer} - \text{Deviation} \quad \text{equation (1)}$$

Similarly, the Client uses equation (2) to detect whether a received request is stale. If the statement in equation (2) is true, the message is not stale. If, however, the statement is false, the message is considered stale and discarded. In equation (2) the value of TTLClient may be equal to ClientCurrentTimestamp−ClientInitialTimestamp.

$$\text{ServerCurrentTimestamp} - \text{ServerInitialTimestamp} \geq \text{TTLClient} - \text{Deviation} \quad \text{equation (2)}$$

Note that in the present disclosure, equations (1) and (2) are only exemplary. The present system may use alternative equations to determine a staleness of a message, where the equations are generally constructed to determine staleness by analyzing time differences between the Client and Server.

FIG. 1 is an illustration of an example message flow between protocol Client 10 and protocol Server 12. The message flow includes several messages, which may each be analyzed to determine whether the messages are stale. For example, both Client 10 and Server 12 may be configured to use either equation (1) or equation (2), respectively, to verify that received messages are not stale. In some implementations, however, only one of Client 10 and Server 12 may be configured to detect stale messages.

Referring to FIG. 1, Client 10 first initiates a registration procedure by transmitting a REGISTER message to Server 12 in step 14. The REGISTER message includes Client 12's current timestamp (ClientInitialTimestamp) which is also stored by Client 12. Server 12 receives the REGISTER message and stores the encoded timestamp as ClientInitialTimestamp. After receiving and processing the REGISTER message, Server 12 transmits a 200 OK message to Client 10 in step 16. The 200 OK message includes Server 12's timestamp that is stored by Client 10 as ServerInitialTimestamp and also stored by Server 12. Accordingly, after completing the registration process, both Client 10 and Server 12 have stored timestamps for both parties including ClientInitialTimestamp and ServerInitialTimestamp.

When transmitting the message in step 14, Client 12 may start one or more timers to ensure that the registration processes occurs within a specified timeframe. For example, with reference to FIG. 1, Client 10 starts a round-trip timer (RTT) and a Guard Timer (Tg). The RTT timer measures the time from the transmission of the REGISTER message in step 14 to receiving the 200 OK response in step 16. The Guard Timer also counts the time before a response from Server 12 is received. In the case of a connectionless transport like UDP, an appropriate Guard Timer may be set to 500 ms, for example. In the case of a connection transport like TCP, however, the guard timer may be set to a value from 2 seconds to 4 seconds. A maximum value may be defined for the Guard Timer, above which the stale algorithm may not be implemented—if latency is too bad, use of the present stale-message-detection algorithm may not confer the benefits described above. Accordingly, as shown in FIG. 1, after receiving the 200 OK message in step 16, Client 10 examines one or more countdown timers to ensure that the 200 OK message was received from Server 12 within a pre-determined timeframe. For example, Client 10 may analyze the RTT and the Guard Timer to ensure that both timers have not exceeded a maximum defined limit.

After registration is complete, Client 10 and Server 12 communicate using an appropriate real-time or non-real-time communication protocol. In step 18, Client 10 transmits a REQUEST message (e.g., a SIP INVITE message) to Server 12. Client 10 includes the client's current timestamp (ClientCurrentTimestamp1) within the REQUEST message. The timestamp may include the time at which the REQUEST message was created, or the time at which the message was transmitted, for example. Upon receiving the message transmitted in step 18, Server 12 stores its current timestamp (ServerCurrentTimestamp1) and processes the REQUEST message to retrieve the ClientCurrentTimestamp1 that describes when the message was originally transmitted by Client 10. Server 12 may then use equation (1) to verify that the REQUEST message is not stale. For example, Server 12 may verify that the time difference between the ClientCurrentTimestamp1 and the ClientInitialTimestamp is greater than or equal to the TTLServer minus a deviation. In this step, TTLServer may be equal to ServerCurrentTimestamp1−ServerInitialTimestamp. If the time difference between the ClientCurrentTimestamp1 and the ClientInitialTimestamp does not exceed or is equal to the TTLServer minus a deviation, Server 12 may consider the message stale and discard the message.

In step 20, Server 12, after receiving the REQUEST message, transmits a 200 OK message. When responding, Server 12 encodes the Server's current timestamp (ServerCurrentTimestamp2) into the message. After receiving the 200 OK message, Client 10 retrieves ServerCurrentTimestamp2 from the message and records the time at which the message was received as ClientCurrentTimestamp2. Client 10 may then use equation (2) to verify that the 200 OK message received from Server 12 is not stale. For example, Client 10 may first verify that the time difference between ServerCurrentTimestamp2 and ServerInitialTimestamp is greater than or equal to the TTLClient minus a deviation. In this step, TTLClient may be equal to ClientCurrentTimestamp2−ClientInitialTimestamp. If the time difference between the ServerCurrentTimestamp2 and the ServerInitialTimestamp does not exceed or is equal to the TTLClient minus a deviation, Client 10 may consider the message stale and discard the message.

In step 22, Client 10 again transmits a REQUEST message to Server 12. Client includes a current timestamp (ClientCurrentTimestamp3) in the REQUEST message, as described above. Server 12 receives the REQUEST message, and retrieves the encoded timestamp ClientCurrentTimestamp3. Server 12 also records the time at which the message was received as ServerCurrentTimestamp3. Server 12 then uses equation (1) to verify that the REQUEST message is not stale. In this example, however, the message transmitted in step 22 was received by Server 12 after it had become stale—the difference between ClientCurrentTimestamp3 and ClientInitialTimestamp is not greater than or equal to TTLServer minus a deviation. Accordingly, when Client 10 transmitted the message, the message was not stale. However, by the time the message was received by Server 12, the message had become stale. Accordingly, Server 12 may be configured to discard the message avoiding unnecessary network processing.

During the process illustrated in FIG. 1, if the protocol Client does not receive a response from the Server side, the Client may be configured to re-transmit the REGISTER message to the Server.

Accordingly, the present system allows for timestamp information to be communicated between a protocol Client and a protocol Server. The timestamp information allows the protocol Client or protocol Server to detect stale messages. After detecting a stale message, the message can be ignored minimizing unnecessary traffic on the network and preventing inaccurate or nonsensical user interactions.

The timestamp information may be encoded within an information element as shown in Table 3.

TABLE 3

| Information Element code Bits 8 7 6 5 4 | I1 information element Name | Reference subclause |
| --- | --- | --- |
| 1 0 0 0 1 | Error-code | 7.4.2.2 |
| 1 0 0 1 1 | From-id | 7.4.2.3 |
| 1 0 1 0 0 | Privacy | 7.4.2.4 |
| 1 0 1 0 1 | SCC-AS-id | 7.4.2.5 |
| 1 0 1 1 0 | Session-identifier | 7.43.2.6 |
| 1 0 1 1 1 | To-id | 7.4.2.7 |
| 1 0 0 1 0 | Replaces | 7.4.2.8 |
| 1 1 0 0 0 | Timestamp | 7.4.2.9 |

The timestamp information element may be used by an ICS UA and the SCC AS to convey local time and is further illustrated in Table 4. The Timestamp information element may contain local time measured in seconds.

TABLE 4

| 8 | 7 | 6 | 5 | 4 | 3 | 2 | 1 | Octet |
|---|---|---|---|---|---|---|---|---|
| Information Element code | | | | | Code specific | | | 1 |
| 1 | 1 | 0 | 0 | 0 | | | | |
| Information Element length (in octets) | | | | | | | | 2 |
| Information Element body | | | | | | | | 3 etc. |

When the Code specific field, i.e., the bits 3, 2, and 1 of the octet number 1 is set to "001", as shown in figure Table 4 and Table 5, the field indicates that the Timestamp information element contains local time measured in seconds in 32 bits format. The time may be conveyed across the I1 interface in a Timestamp information element. This information element may be included to provide the SCC AS local time to the ICS UE. The information element may also be included to provide the ICS UE local time to the SCC AS. The Timestamp information element may specify a local time on an I1 message sender. The local time may be measured in seconds and may be 32 bits long.

TABLE 5

| (octet 1) Bits 3 2 1 | Code specific |
|---|---|
| 0 0 0 | Unspecified |
| 0 0 1 | Timestamp (Note 1) |
| | Other values are reserved for future use |
| (octet 3) Bits 8 7 6 5 4 3 2 1 | the first (right) 8 bits of the Timestamp |
| (octet 4) Bits 8 7 6 5 4 3 2 1 | the next 8 bits of the Timestamp |
| (octet 5) Bits 8 7 6 5 4 3 2 1 | the next 8 bits of the Timestamp |
| (octet 6) Bits 8 7 6 5 4 3 2 1 | the next 8 bits of the Timestamp |

(Note 1) - Timestamp in 32 bits format.

In accordance with the present disclosure, Table 6 illustrates I1 INVITE message content including a timestamp.

TABLE 6

| Information element | Type/Reference | Presence | Format | Length |
|---|---|---|---|---|
| Protocol Information | Protocol Information 7.2.2.1.2 | M | V | 1 |
| Message Type | Request Message - INVITE 7.2.2.2.1.2 | M | V | 2 |
| Call ID | Call-Id 7.2.2.1.4 | M | V | 2 |
| Message Sequence Number | Sequence-Id 7.2.2.1.5 | M | V | 1 |
| Timestamp | Timestamp 7.3.2.5 | M | V | 1 |
| To | To 7.3.2.3 | M | LV | FFS |
| From | From 7.3.2.4 | O | LV | FFS |

In the case of ICS UE CS session origination, when the ICS UE originates a session using an I1 reference point, the UE may generate an I1 Invite message that includes a Timestamp information element that includes current local time measured in seconds. The element may be used by the SCC AS to determine the staleness of the message.

In the case of SCC AS CS Session Termination without UE assisted Terminating Access Domain Selection (T-ADS), prior to sending an I1 Invite message towards the ICS UE, the SCC AS may perform the T-ADS and choose the CS domain for the setup of the media. When sending an I1 Invite towards the ICS UE, the SCC AS may create an I1 Invite message that includes a Timestamp information element that includes current local time measured in seconds. The element can be used by the ICS UE to determine the staleness of the message.

In the present system, if an ICS UE receives an I1 Invite message from the SCC AS, and the UE determines that no I1 session exists for the received Call-Identifier value, the ICS UE may retrieve the SCC AS local time value from the Timestamp information element of the I1 Invite message, and validate the staleness of the message by applying the following equation: SCC_AS_time_in_the_I1_Invite_message−SCC_AS_time_stored_in_subclause 6.2.c [24.292]>=(ICS_UE_local_time−ICS_UE_time_stored_in_subclause 6.2.b [24.229])−Deviation. The deviation parameter may be set to 64*T1 seconds. If the equation is true, the message is not stale and the message may be processed by the following sections. Otherwise, the message may be discarded and no response is generated to the I1 Invite message.

The ICS UE then stores the information contained in the I1 Invite message, including the called party identity included in the To-id information element, the calling user's public user identity included in the From-id information element, the IUA PSI DN (i.e., the E.164 number) included in the SCC-AS-id information element, the Message sequence number, the Call-Identifier (Part-2) subfield, the STI value (i.e. the E.164 number) if received in the Session-identifier information element, and transport layer information identifying the transport connection over which the I1 Invite message was received.

The ICS UE then initiates a call over a CS bearer by sending a SETUP message to the MSC Server as specified in 3GPP TS 24.008 with the Called Party BCD Number information element set to the received SCC AS PSI DN (i.e., the E.164 number).

In a similar manner, upon receiving an initial I1 Invite message from the ICS UE via the I1 reference point, the SCC AS may retrieve the ICS UE local time value from the Timestamp information element of the I1 Invite message, and validate the staleness of the message by applying the following equation: ICS_UE_time_in_the_I1_Invite_message−ICS_UE_time_stored_in_subclause 6.4.d [24.292]>=(SCC_AS_local_time−SCC_AS_time_stored_in_subclause 6.4.e [24.229])−Deviation. The deviation parameter may be 64*T1 seconds. If the equation is true the message is not stale and the message may be processed. Otherwise, the message may be discarded and no response is generated to the I1 Invite message.

In order to detect stale I1 messages, the ICS UE and SCC AS are synchronized in time. The staleness of the I1 messages can be determined by the following two steps. In a first step, the ICS UE originates initial time synchronization procedures with the SCC AS when the ICS UE starts up. During this procedure, both the ICS UE and SCC AS receive an initial time of the peer. The time value may be measured in seconds. The initial time value is not important as long as the subsequent time measurements are increased accordingly. In a second step, an I1 message receiver (ICS UE or SCC AS) compares the I1 message current time of the peer with the initial time established in step 1, and based on the time difference between the current and initial time the I1 message receiver makes a decision about the staleness of the message. If the message is stale the message may be discarded and no response generated to the I1 message.

The initial time value can be initialized using one of the following methods: a local time of the machine or terminal, a randomly generated time, and zero.

When the ICS UE initiates the synchronization procedure using an I1 reference point, the UE may generate an I1 Register message that includes a Message type subfield set to the value that includes that this is an I1 Register message, a new value in the Call-Identifier (Part-1) subfield, as specified in subclause 7.2.2 (the Call-Identifier may uniquely identify this I1 session between the ICS UE and the SCC AS), an allocated Message sequence number, a From-id information element that includes either a SIP URI or an E.164 number, and it will be used by the SCC AS to identify the ICS UE, and a Timestamp information element that includes the initial time generated according to the subclause 6.4.2. The element will be used by the SCC AS to validate the ICS UE I1 messages. The Timestamp value is stored by the ICS UE. The UE may then select the transport layer protocol depending on the access network type, and forward the I1 Register message toward the SCC AS.

When the ICS UE receives an I1 Success message, the UE may verify whether an I1 session exists for the received Call-Identifier value, verify whether the message is in sequence according to the Message sequence number value, and retrieve and store the Timestamp header value received in the response. If the ICS UE does not receive an I1 Success message within 64*T1 seconds, for example, the UE may consider the I1 Register message as failed and retry the synchronization procedure again after an interval of time.

Upon receiving an I1 Register message from the ICS UE via the I1 reference point, the SCC AS may retrieve the ICS UE time value from the Timestamp information element of the I1 Register message and store the value, save the received Call-Identifier and Sequence-ID values and use them for further reference to this session, generate an I1 Success message containing the following information: a Message type field set to the value that indicates that is an I1 Success message, the stored Call-ID header value, one plus the stored Sequence-ID header value (store and include the Sequence-ID header value), and the Timestamp information element (the element may be used by the ICS UE to validate the SCC AS I1 messages, the Timestamp value may be stored by the SCC AS), and send the I1 Success message towards the originating UE over the transport layer connection over which the I1 Register message was received.

Figure 2:
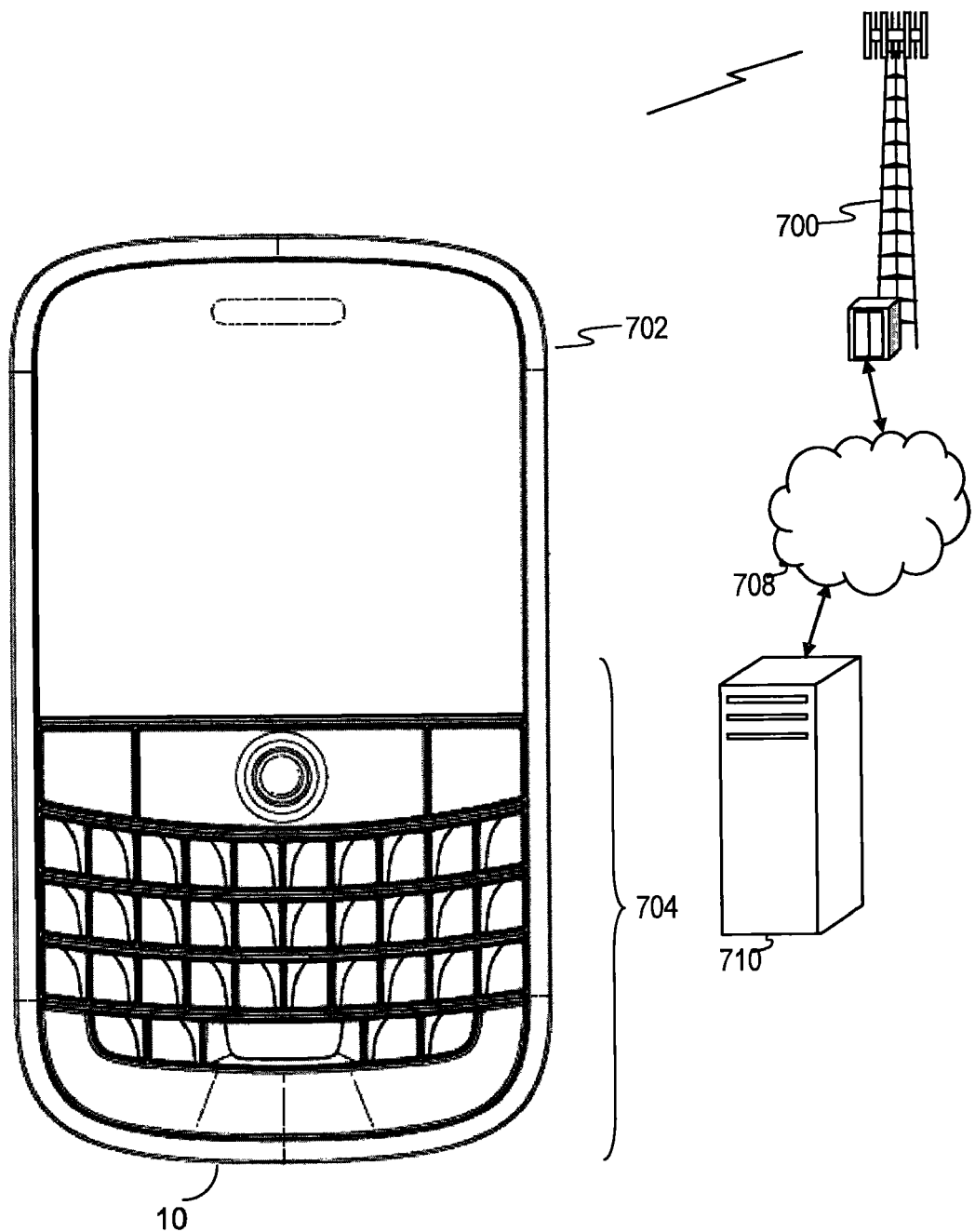
FIG. 2 is a diagram of a wireless communications system including a UA operable for some of the various embodiments of the disclosure.

FIG. 2 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 3:
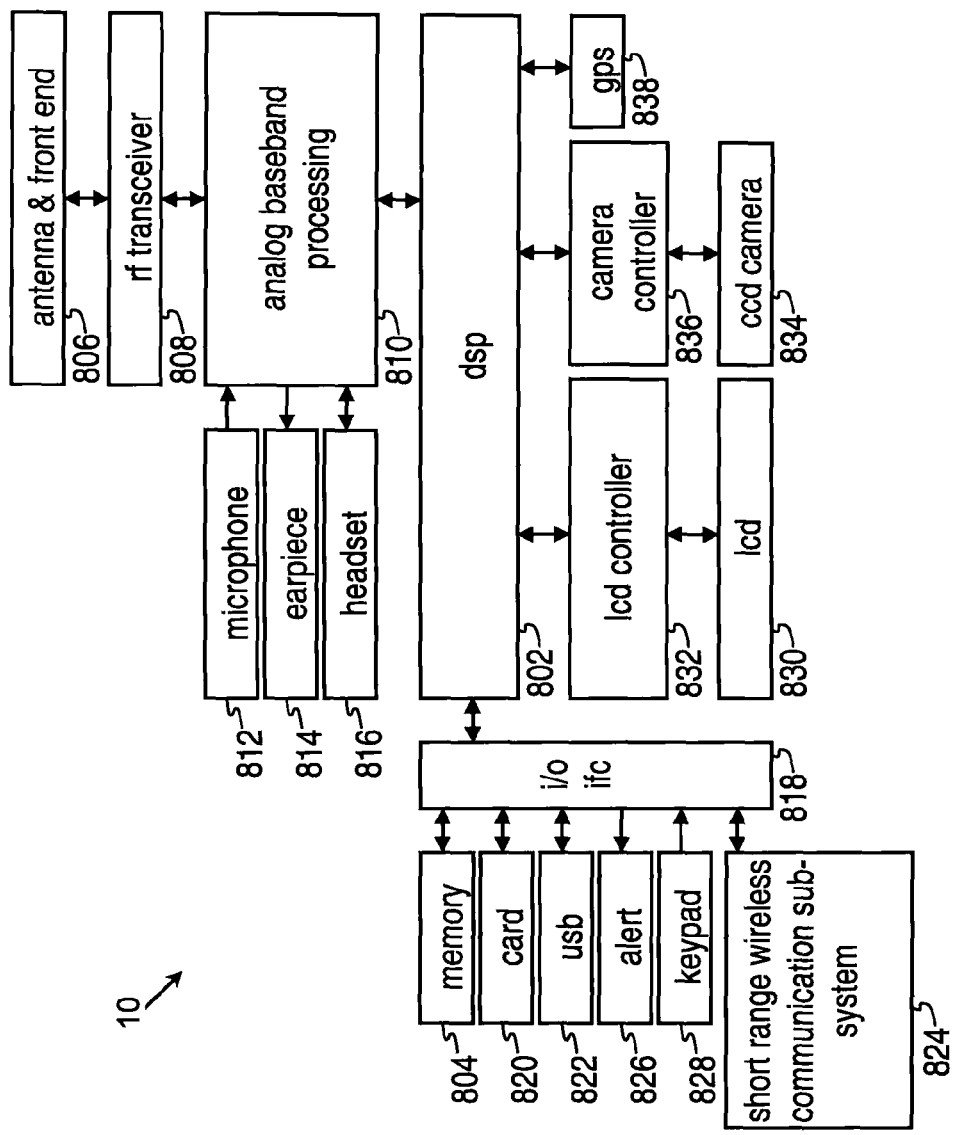
FIG. 3 is a block diagram of a UA operable for some of the various embodiments of the disclosure.

FIG. 3 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 4:
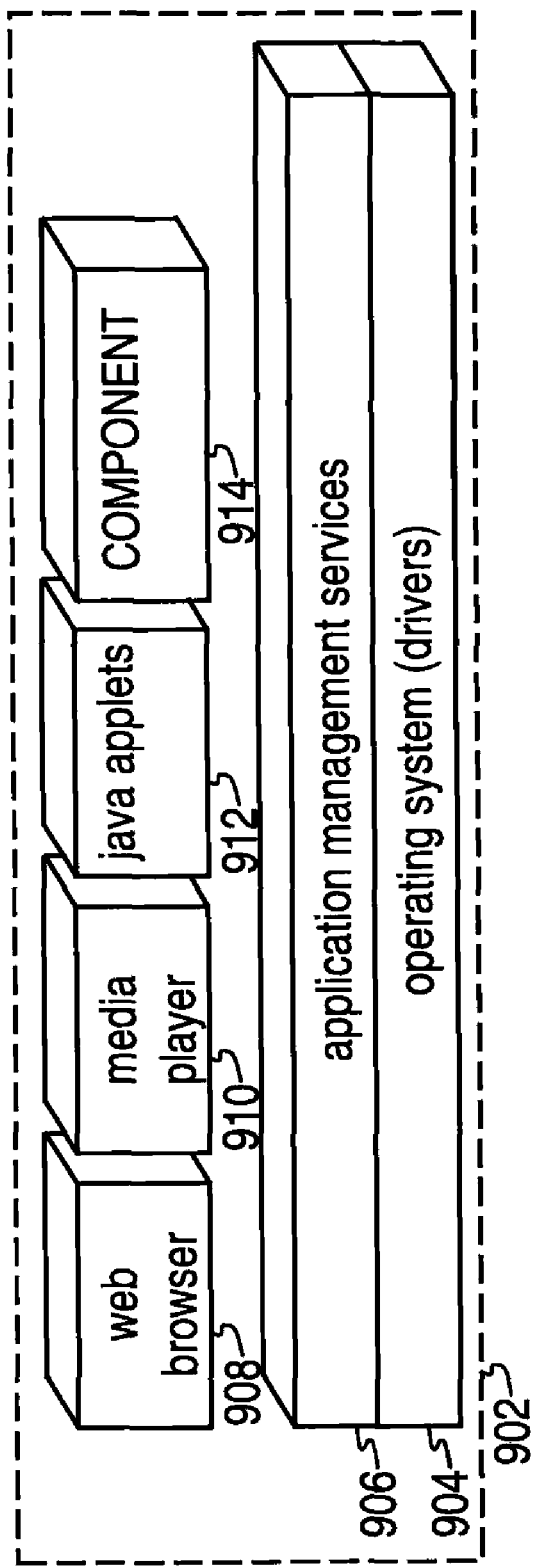
FIG. 4 is a diagram of a software environment that may be implemented on a UA operable for some of the various embodiments of the disclosure.

FIG. 4 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 4 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

Figure 5:
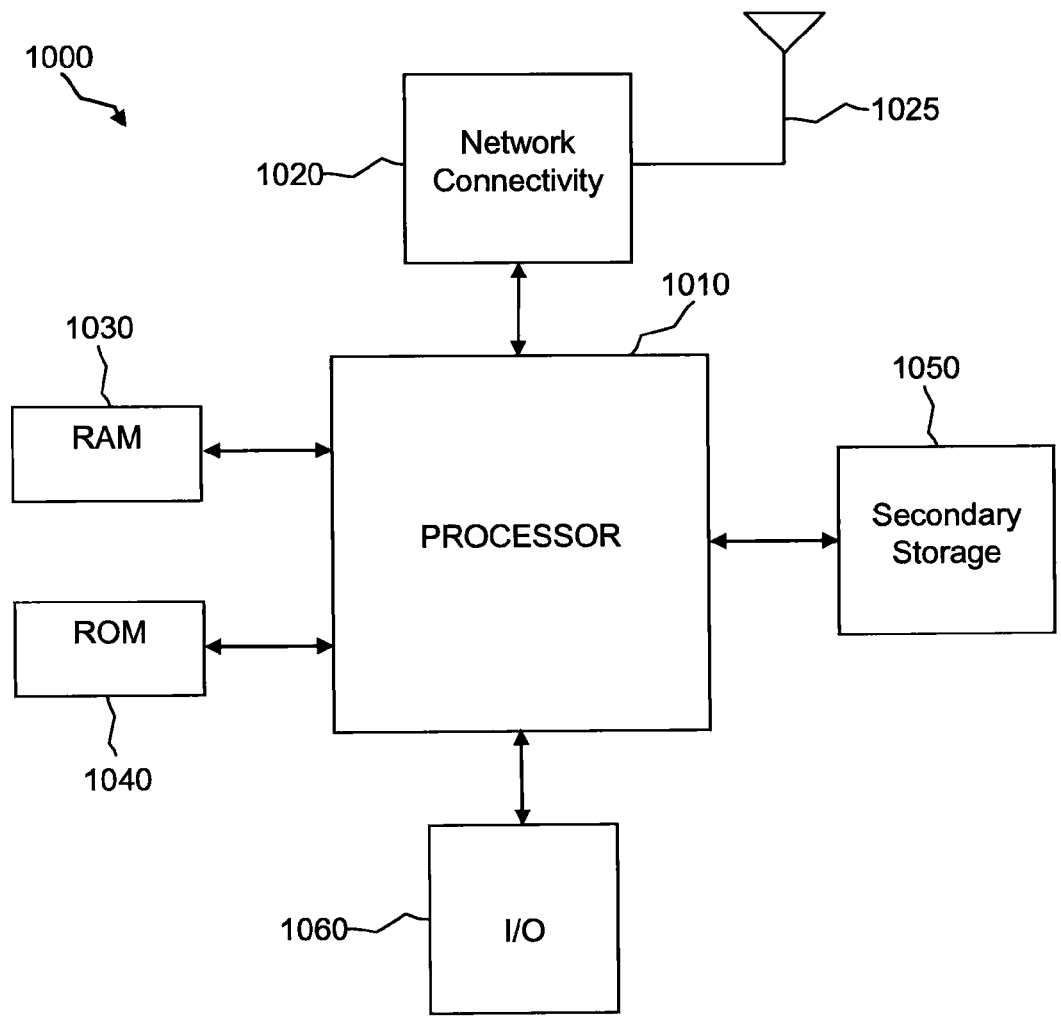
FIG. 5 is an illustrative general purpose computer system suitable for some of the various embodiments of the disclosure.

The UA 10, base station 12, and other components described above might include a processing component that is capable of executing instructions related to the actions described above. FIG. 5 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embodied in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this disclosure, the following claims are made:

What is claimed is:

1. A method for handling stale messages, the method including:
   transmitting a first message to a peer entity, the first message including a first timestamp;
   receiving a second message from the peer entity, the second message being related to the first message and including a second timestamp;
   receiving a third message from the peer entity, the third message including a third timestamp;
   determining a staleness of the third message using the first timestamp, second timestamp, and third timestamp; and
   when the third message is stale, at least one of ignoring and discarding the third message.

2. The method of claim 1, wherein determining a staleness of the third message using the first, second and third timestamp includes:
   determining a difference between the third timestamp and the second timestamp; and
   determining a difference between a time at which the third message was received and the first timestamp.

3. The method of claim 2, wherein determining a staleness of the third message includes comparing a difference between the third timestamp and the second timestamp to a difference between a time at which the third message was received and the first timestamp minus a deviation.

4. The method of claim 1, wherein the first message and the second message are transmitted using a real-time transport protocol.

5. The method of claim 1, wherein the third message is transmitted using a non-real-time transport protocol.

6. The method of claim 5, wherein the non-real-time transport protocol includes at least one of short message service (SMS) and unstructured supplementary service data (USSD).

7. The method of claim 1, wherein at least one of the first timestamp and second timestamp has a value of at least one of zero and a random value.

8. The method of claim 1, wherein at least one of the first timestamp, second timestamp, and third timestamp includes a value retrieved from a third party time server.

9. The method of claim 1, including:
   detecting at least one of a reset and a restart condition; and
   transmitting a timestamp synchronization request.

10. A method for handling stale messages, the method including:
   determining a first timestamp, the timestamp including a current time;
   transmitting a registration request to a peer entity, the registration request including the first timestamp;
   receiving a registration response from the peer entity, the registration response including a second timestamp;
   receiving a third message from the peer entity, the third message including a third timestamp;
   determining a staleness of the third message using the first timestamp, second timestamp, and third timestamp;
   when the third message is stale, at least one of ignoring and discarding the third message; and
   when the third message is not stale, processing the third message.

11. The method of claim 10, wherein determining a staleness of the third message using the first, second and third timestamp includes:
   determining a difference between the third timestamp and the second timestamp; and
   determining a difference between a time at which the third message was received and the first timestamp.

12. The method of claim 11, wherein determining a staleness of the third message includes comparing a difference between the third timestamp and the second timestamp to a difference between a time at which the third message was received and the first timestamp minus a deviation.

13. The method of claim 10, wherein the registration request and the registration response are transmitted using a real-time transport protocol.

14. The method of claim 10, wherein the third message is transmitted using a non-real-time transport protocol.

15. The method of claim 14, wherein the non-real-time transport protocol includes at least one of short message service (SMS), unstructured supplementary service data (USSD).

16. The method of claim 10, wherein at least one of the first timestamp and second timestamp has a value of at least one of zero and a random value.

17. The method of claim 10, wherein at least one of the first timestamp, second timestamp, and third timestamp includes a value retrieved from a third party time server.

18. The method of claim 10, including:
   detecting at least one of a reset and a restart condition; and
   transmitting a timestamp synchronization request.

19. A communication apparatus for handling stale messages, the communication apparatus including:
   a processor, the processor being configured to:
      transmit a first message to a peer entity, the first message including a first timestamp;
      receive a second message from the peer entity, the second message being related to the first message and including a second timestamp;
      receive a third message from the peer entity, the third message including a third timestamp;
      determine a staleness of the third message using the first timestamp, second timestamp, and third timestamp; and
      when the third message is stale, at least one of ignore and discard the third message.

20. The communication apparatus of claim 19, wherein the processor is configured to:
   determine a difference between the third timestamp and the second timestamp; and
   determine a difference between a time at which the third message was received and the first timestamp.

21. The communication apparatus of claim 20, wherein the processor is configured to compare a difference between the third timestamp and the second timestamp to a difference between a time at which the third message was received and the first timestamp minus a deviation.

22. The communication apparatus of claim 19, wherein the first message and the second message are transmitted using a real-time transport protocol.

23. The communication apparatus of claim 19, wherein the third message is transmitted using a non-real-time transport protocol.

24. The communication apparatus of claim 23, wherein the non-real-time transport protocol includes at least one of short message service (SMS), unstructured supplementary service data (USSD).

25. The communication apparatus of claim 19, wherein at least one of the first timestamp and second timestamp has a value of at least one of zero and a random value.

26. The communication apparatus of claim 19, wherein at least one of the first timestamp, second timestamp, and third timestamp includes a value retrieved from a third party time server.

27. The communication apparatus of claim 19, wherein the processor is configured to:

detect at least one of a reset and a restart condition; and
transmit a timestamp synchronization request.

* * * * *